Dec. 8, 1964 L. H. SENCE 3,160,108
THRUST CARRYING ARRANGEMENT FOR FLUID HANDLING MACHINES
Filed Aug. 27, 1962
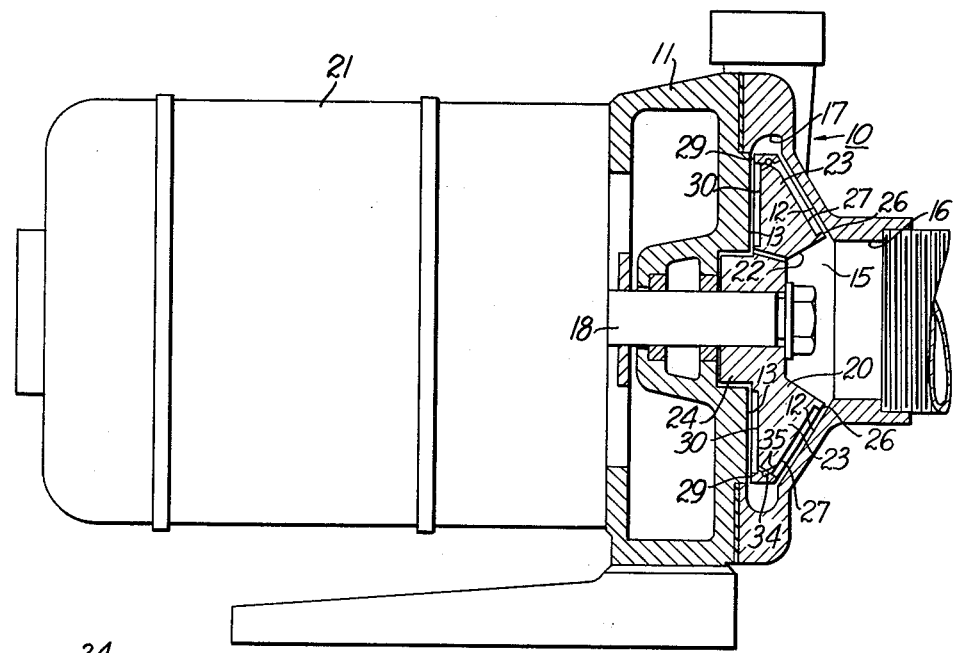
Fig. 1
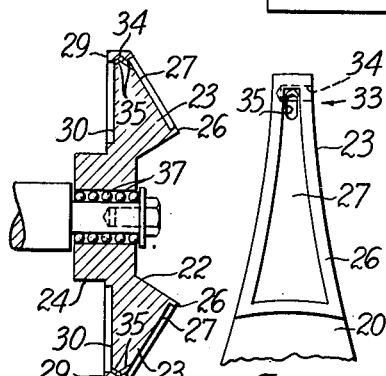
Fig. 4
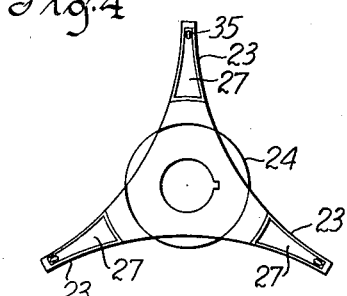
Fig. 2
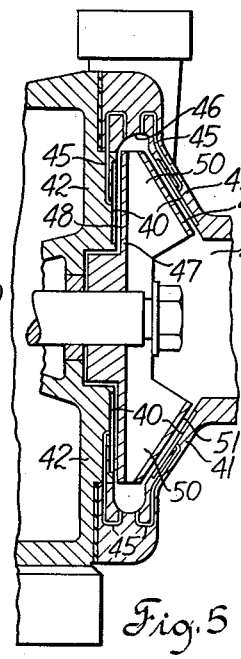
Fig. 3
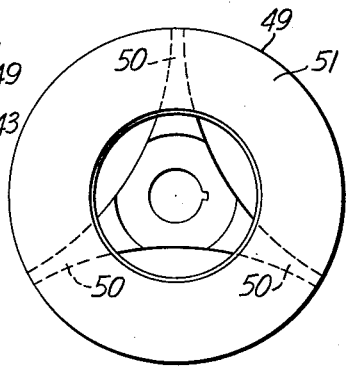
Fig. 5
Fig. 6
Inventor
Leonard H. Sence
By Robert B. Benson
Attorney

United States Patent Office

3,160,108
Patented Dec. 8, 1964

3,160,108
THRUST CARRYING ARRANGEMENT FOR
FLUID HANDLING MACHINES
Leonard H. Sence, Milford, Ohio, assignor to Allis-
Chalmers Manufacturing Company, Milwaukee,
Wis.
Filed Aug. 27, 1962, Ser. No. 219,580
3 Claims. (Cl. 103—112)

This invention relates generally to fluids handling devices. More particularly this invention relates to thrust bearings for fluid handling machines such as rotary pumps or compressors.

In the past the thrust load on an impeller was usually taken up by suitably arranged ball bearings. In some applications ball bearings were not acceptable and lapped thrust bearings were used. However, neither of these arrangements is entirely satisfactory because of the assembly problems in connection with the ball bearings and the relatively short life of the lapped thrust bearing arrangement.

Applicant has overcome the problems mentioned above by providing a hydrostatic thrust bearing arrangement in the impeller itself. This arrangement provides for an automatic balancing of the thrust load on the impeller and provides a unit having an exceptionally long life. Some of the fluid being pumped by the impeller is diverted through conduits from a high pressure area to suitably located hydrostatic bearings acting on the sides of the impeller and the walls of the casing which define the impeller chamber. If the impeller tends to move axially in one direction due to the thrust it closes off the clearance between the impeller and the wall surface towards which it is moving thereby increasing the pressure in the bearing on that side while at the same time moving away from the opposite wall surface and thereby increasing the clearance between that wall and that side of the impeller thus reducing the pressure in the bearing on that side of the impeller. This causes the impeller to automatically move back toward the low pressure side. This process continues as the impeller seeks its normal centered and balanced position.

Therefore, it is the object of this invention to provide a new and improved fluid handling device.

Another object of this invention is to provide a new and improved thrust bearing arrangement for rotary compressors and pumps.

Another object of this invention is to provide a new and improved thrust balancing arrangement for high speed compressors and pumps.

Another object of the invention is to provide a rotary compressor or pump having fluid pressure thrust balancing means at opposite sides of the impeller to stabilize the axial position of the impeller and keep the impeller spaced from the adjacent walls of the impeller chamber.

Other objects and advantages of this invention will be apparent from the following description when read in connection with the accompanying drawings, in which:

FIG. 1 is a side view partially in section of a centrifugal pump embodying the impeller and thrust balancing arrangement of this invention;

FIG. 2 is a front view of the inlet side of the impeller of FIG. 1;

FIG. 3 is an enlarged front view of one vane of the impeller shown in FIG. 2;

FIG. 4 is a cross section view showing an alternate mounting arrangement for the impeller of FIG. 2;

FIG. 5 is a cross section view illustrating an alternate embodiment of the invention with the pressure pads or recesses formed in the pump casing and with the impeller having a complete shroud on either side; and FIG. 6 is a front view of the impeller illustrated in FIG. 5.

Although this invention is applicable to many fluid handling devices, it has been specifically illustrated in the drawing in a centrifugal pump 10 having a casing 11, the walls 12, 13 of which are spaced apart to define an impeller chamber 15 having an axial inlet 16 and a radially spaced discharge volute 17. A shaft 18 extends through the rear wall portion 13 of the casing and is connected to an impeller 20 positioned within the chamber 15. The shaft 18 is adapted to be connected to a suitable source of power such as the illustrated electric motor 21. The impeller has an intake 22 aligned with the inlet 16 in the casing.

The impeller 20 illustrated in FIGS. 1–4 comprises a series of blades or vanes 23 mounted on a hub 24 and extending from the intake 22 radially outward to the outer periphery of the impeller. The vanes 23 are arcuately spaced around the hub and preferably there are three vanes. The impeller 20 is provided with hydrostatic bearing means acting between the sides of the impeller and the walls of the impeller chamber 15. Specifically the front surfaces 26 of the vanes 23 are relatively flat and positioned adjacent an opposing wall surface 12 of the casing. Suitable recesses or pressure pads 27 are formed in these front surfaces 26 and the remainder of the surface area rotates very close to the wall surfaces 12 of the impeller chamber. The rear surface 29 of the vanes 23 also have a series of recess areas 30 opposite the wall surface 13 of the impeller chamber.

The side 33 of the vane 23 that faces the direction of rotation of the impeller 20 is provided with an inlet conduit 34 that extends into the interior of the vane 23. This conduit 34 is connected by suitable internal conduits 35 to the pressure pads or recesses 27, 30. The total area of the thrust pads or recesses on the front and rear surfaces of the impeller is calculated so as to provide a substantially equal force acting against the pump casing in opposite directions parallel to the axis of the shaft 18. Hence the pressure pad areas on the front surface of the impeller vanes will be slightly larger than the recess area on the rear surface of the vanes which are perpendicular to the axis of the shaft.

The impeller shown in FIG. 4 is mounted on a set of ball bearings 37 which are in turn mounted in a reduced portion of the shaft. This arrangement allows the impeller to slide axially more easily relative to the shaft and therefore it responds more readily to the pressure unbalances on the impeller.

Suitable driving means such as a key (not shown) is positioned intermediate the arcuately spaced sets of ball bearings to connect the shaft to the impeller and thereby transmit power from the shaft to the impeller.

In the alternate embodiment shown in FIGS. 5 and 6, the pressure pads or recesses 40 are formed in the wall portions 41, 42 of the casing defining the impeller chamber 43. Suitable conduits 45 connect the pressure pads to the discharge volute 46 of the pump. The rear of the impeller is a disk 47 having a smooth flat annular surface 48 and the inlet side of the impeller is provided with a shroud 49 on the outboard side of the vanes 50, the shroud 49 extends the length of the vanes 50 and its outer surface provides a smooth conical surface 51 positionable adjacent the wall surface 41 of the impeller chamber 43. In this embodiment the fluid under pressure is directed from the discharge volute 46 into the pressure pads 40 in the wall surfaces 41, 42 of the housing rather than in the impeller. Aside from that, it operates in accordance with the same principles as the first embodiment.

In operation, when the pump 10 is started up and the impeller begins to rotate, it draws fluid to the inlet 16 of the pump and throws it radially outward into the discharge volute 17. As this is being done the vanes 23 of the impeller impart a pressure and velocity to the fluid. Some of the fluid being pumped enters the inlet conduit 34 in the vanes and flows from there through internal conduits 35 to the pressure pads 27, 30. The fluid under pressure in the pads tends to move the impeller away from the side walls 12, 13 of the impeller chamber 15. Some of the fluid in the pressure pads 27 leaks through the small clearances between the front surface 26 of the impeller vanes and the wall surface 12. The fluid in pressure pads 30 leaks between the rear surface 29 of vanes 23 and wall surface 13. If the thrust on the impeller in either direction exceeds thrust in the opposite direction it tends to move the impeller toward one of the wall surfaces. This in turn reduces the clearance between that wall surface and the impeller thereby increasing the pressure in the pressure pads. At the same time this movement of the impeller tends to increase the clearances between the opposing wall surface and the other side of the impeller. This reduces the pressure in the opposing pressure pads and hence causes the impeller to move axially back toward its initial or equilibrium position. The impeller continues to oscillate axially in this manner constantly seeking an equilibrium position.

The operation of the impeller 55 in the second embodiment shown in FIGS. 5 and 6 is substantially the same as for the unit illustrated in the unit of FIGS. 1 and 3 with the exception that the high pressure fluid is taken from the discharge volute 46 and directed through conduits 45 to pressure pads 40 in the walls 41, 42 of the pump casing rather than to pads in the pump impeller. However, if the impeller moves toward one of these pads 41 or 42 it cuts down the clearance between the wall surface and the impeller shroud and thereby increases the pressure in those pads and at the same time increase the clearance between the other wall surface and the other impeller shroud thereby decreasing the pressure in that area. This, of course, tends to unbalance the system forcing the fluid to push the impeller back toward its equilibrium position.

Although but two embodiments of this invention have been illustrated and described it will be apparent to those skilled in the art that various modifications and changes can be made therein without departing from the spirit of the invention or the scope of the appended claims.

Having now particularly described and ascertained the nature of my said invention and the manner in which it is to be performed, I declare that what I claim is:

1. A fluid handling device comprising: a casing having spaced wall members defining an impeller chamber therebetween, an impeller rotatably mounted in said chamber, said impeller having radially extending arcuately spaced vanes having axially spaced opposed end surfaces positioned to rotate between said wall members, said opposed surfaces of said vanes having recessed areas defined therein to form balancing pads, said recessed areas being positioned adjacent said wall members and conduits in said vanes for connecting said recessed areas to high pressure fluid.

2. A fluid handling device comprising: a casing having spaced apart wall members defining an impeller chamber therebetween, an impeller rotatably mounted in said chamber, means for rotating said impeller in a predetermined direction, said impeller having radially extending arcuately spaced vanes positioned to rotate between said wall members, each of said vanes having a rear surface and an axially spaced front surface, said rear surface and said front surface of said vanes having recessed areas defined therein, said recessed areas being positioned adjacent said wall members and conduits in said vanes opening to the side of said vanes facing the direction of rotation of said impeller and connected to said recessed areas to provide high pressure fluid to said recessed areas.

3. The fluid handling device of claim 3 in which the inlet to said conduit opening to the side of the vane facing the direction of rotation is positioned adjacent the radially outer tip of said vanes.

References Cited in the file of this patent

UNITED STATES PATENTS

| | | |
|---|---|---|
| 633,732 | Price | Sept. 26, 1899 |
| 1,065,732 | Schneible | June 24, 1913 |
| 1,654,907 | Wood | Jan. 3, 1928 |
| 2,127,805 | Goddard | Aug. 23, 1938 |
| 2,127,865 | Goddard | Aug. 23, 1938 |
| 2,822,758 | Dove | Feb. 11, 1958 |
| 2,853,019 | Thornton | Sept. 13, 1958 |

FOREIGN PATENTS

| | | |
|---|---|---|
| 643,177 | France | May 10, 1928 |
| 117,558 | Great Britain | July 25, 1918 |
| 202,042 | Germany | Sept. 24, 1908 |
| 137,558 | Switzerland | Mar. 17, 1930 |